United States Patent
Cherepinsky

(10) Patent No.: US 11,279,496 B2
(45) Date of Patent: Mar. 22, 2022

(54) SYSTEM FOR RELIABLE LANDING GEAR CONTACT WITH IDENTIFICATION OF THE SURFACE

(71) Applicant: Sikorsky Aircraft Corporation, Stratford, CT (US)

(72) Inventor: Igor Cherepinsky, Sandy Hook, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 417 days.

(21) Appl. No.: 16/213,679

(22) Filed: Dec. 7, 2018

(65) Prior Publication Data

US 2019/0256220 A1    Aug. 22, 2019

Related U.S. Application Data

(60) Provisional application No. 62/633,309, filed on Feb. 21, 2018.

(51) Int. Cl.
| | | |
|---|---|---|
| *B64D 45/04* | (2006.01) | |
| *B64C 25/36* | (2006.01) | |
| *B64D 45/00* | (2006.01) | |
| *B64C 25/32* | (2006.01) | |

(52) U.S. Cl.
CPC ............. *B64D 45/04* (2013.01); *B64C 25/36* (2013.01); *B64C 2025/325* (2013.01); *B64D 2045/008* (2013.01)

(58) Field of Classification Search
CPC .. B64D 45/04; B64D 2045/008; B64D 45/02; B64D 45/00; B64C 25/36; B64C 2025/325; B64C 25/001
See application file for complete search history.

(56) References Cited

U.S. PATENT DOCUMENTS

| | | | | |
|---|---|---|---|---|
| 3,154,270 A | * | 10/1964 | Jensen | B64C 25/56 244/101 |
| 3,188,025 A | * | 6/1965 | Moorehead | B64C 30/00 244/55 |
| 3,762,670 A | * | 10/1973 | Chillson | B64C 25/36 244/50 |
| 4,524,929 A | * | 6/1985 | Gebhard | B64C 25/001 244/102 SL |
| 4,821,983 A | * | 4/1989 | Aubry | B64C 25/60 244/104 FP |

(Continued)

FOREIGN PATENT DOCUMENTS

| | | | | |
|---|---|---|---|---|
| CA | 3060808 A1 | * | 1/2017 | ............. B64F 1/007 |
| CN | 105564663 A | * | 5/2016 | |

(Continued)

*Primary Examiner* — Behrang Badii
*Assistant Examiner* — Jalal C Coduroglu
(74) *Attorney, Agent, or Firm* — Michael Best & Friedrich LLP

(57) ABSTRACT

A landing assembly and method of landing an aircraft. The landing assembly includes a landing gear, a charging circuit, a sampling circuit and a processor. The charging circuit applies a charge to the landing gear and the sampling circuit measures a discharge rate of the electrical charge from the landing gear. The processor determines a contact between the landing gear and a surface from the discharge rate.

13 Claims, 3 Drawing Sheets

(56) References Cited

U.S. PATENT DOCUMENTS

| | | | | |
|---|---|---|---|---|
| 5,651,430 A * | 7/1997 | Rancourt | ............... | B64C 25/36 188/1.11 L |
| 6,592,245 B1 * | 7/2003 | Tribelsky | ............... | B64F 1/007 362/259 |
| 7,152,547 B1 * | 12/2006 | Hovland | ............... | B63B 17/00 114/261 |
| 7,808,210 B2 * | 10/2010 | Darilek | ............... | H01M 10/48 320/132 |
| 8,616,497 B2 * | 12/2013 | Ying | ............... | B64F 1/007 244/114 R |
| 9,387,940 B2 * | 7/2016 | Godzdanker | ............... | E01F 3/00 |
| 9,394,060 B2 * | 7/2016 | Brody | ............... | E04H 6/44 |
| 9,415,869 B1 * | 8/2016 | Chan | ............... | G05D 1/104 |
| 9,417,325 B1 * | 8/2016 | Bry | ............... | G08G 5/0013 |
| 9,457,895 B1 * | 10/2016 | Barmichev | ............... | B60C 11/14 |
| 9,573,701 B2 * | 2/2017 | Beardsley | ............... | B64C 39/024 |
| 9,586,694 B2 * | 3/2017 | Suokas | ............... | B64D 45/04 |
| 9,711,851 B1 * | 7/2017 | Cesarano | ............... | B64C 39/024 |
| 9,718,390 B1 * | 8/2017 | Hadley | ............... | B60P 1/025 |
| 9,718,564 B1 * | 8/2017 | Beckman | ............... | B64C 39/024 |
| 9,776,717 B2 * | 10/2017 | Spinelli | ............... | B64F 1/222 |
| 9,849,981 B1 * | 12/2017 | Burgess | ............... | G05D 1/0094 |
| 9,876,510 B2 * | 1/2018 | Heldeis | ............... | H03M 11/003 |
| 10,042,359 B1 * | 8/2018 | Konrardy | ............... | G06Q 10/1095 |
| 10,068,728 B2 * | 9/2018 | Huska | ............... | G06F 3/016 |
| 10,139,820 B2 * | 11/2018 | Liu | ............... | H04W 4/44 |
| 10,198,955 B1 * | 2/2019 | Boyd | ............... | B64D 45/04 |
| 10,266,253 B1 * | 4/2019 | Bryant | ............... | B64C 25/22 |
| 2008/0258014 A1 * | 10/2008 | McCoskey | ............... | B64C 25/405 244/221 |
| 2010/0070220 A1 * | 3/2010 | Darilek | ............... | G01R 31/3828 702/63 |
| 2012/0043418 A1 * | 2/2012 | Isotani | ............... | B64F 5/00 244/102 R |
| 2014/0027571 A1 * | 1/2014 | Barmichev | ............... | B60C 11/1612 244/103 R |
| 2015/0037624 A1 * | 2/2015 | Thompson | ............... | H01M 10/425 429/50 |
| 2015/0239554 A1 * | 8/2015 | Birchette | ............... | B64C 25/58 244/104 FP |
| 2016/0214720 A1 * | 7/2016 | Hara | ............... | F16D 65/847 |
| 2016/0236790 A1 * | 8/2016 | Knapp | ............... | B64C 11/44 |
| 2016/0236796 A1 * | 8/2016 | Piroozmandi | ............... | B64C 25/34 |
| 2016/0334894 A1 * | 11/2016 | Fujitsuka | ............... | G06F 3/0442 |
| 2017/0220037 A1 * | 8/2017 | Berestov | ............... | G06K 9/0063 |
| 2017/0251096 A1 * | 8/2017 | Koepke | ............... | H04M 1/72421 |
| 2017/0255293 A1 * | 9/2017 | Sundara-Rajan | ... | G06F 3/04186 |
| 2017/0277176 A1 * | 9/2017 | Hutson | ............... | G06F 3/011 |
| 2017/0291704 A1 * | 10/2017 | Alegria | ............... | G05D 1/0866 |
| 2017/0316701 A1 * | 11/2017 | Gil | ............... | G08G 5/0069 |
| 2017/0349280 A1 * | 12/2017 | Liao | ............... | G05D 1/0033 |
| 2017/0350148 A1 * | 12/2017 | King | ............... | B64F 1/368 |
| 2017/0355295 A1 * | 12/2017 | Gutowitz | ............... | B60K 1/00 |
| 2018/0074519 A1 * | 3/2018 | Qin | ............... | H04N 5/2252 |
| 2018/0111683 A1 * | 4/2018 | Di Benedetto | ........ | G06Q 30/04 |
| 2018/0129962 A1 * | 5/2018 | Mathew | ............... | G06Q 30/00 |
| 2018/0134412 A1 * | 5/2018 | Poh | ............... | B64F 1/222 |
| 2018/0188855 A1 * | 7/2018 | Sundara-Rajan | ..... | G06F 3/0447 |
| 2018/0204111 A1 * | 7/2018 | Zadeh | ............... | G06K 9/3233 |
| 2018/0242274 A1 * | 8/2018 | Liu | ............... | G01S 5/02 |
| 2018/0249291 A1 * | 8/2018 | Shamim | ............... | H04W 4/023 |
| 2018/0301045 A1 * | 10/2018 | Pesik | ............... | G06T 7/73 |
| 2018/0320402 A1 * | 11/2018 | Evans | ............... | B60L 53/14 |
| 2018/0327092 A1 * | 11/2018 | Deng | ............... | B64C 39/024 |
| 2018/0354650 A1 * | 12/2018 | Tan | ............... | E01D 18/00 |
| 2018/0372834 A1 * | 12/2018 | Shoshan | ............... | G01S 5/0252 |
| 2019/0144102 A1 * | 5/2019 | Bryant | ............... | B64C 25/22 701/3 |
| 2019/0250640 A1 * | 8/2019 | O'Flaherty | ............ | B64C 39/024 |
| 2019/0256220 A1 * | 8/2019 | Cherepinsky | ........ | B64D 45/02 |
| 2020/0317338 A1 * | 10/2020 | Wang | ............... | G05D 1/0676 |

FOREIGN PATENT DOCUMENTS

| | | | | |
|---|---|---|---|---|
| CN | 107428412 A | * | 12/2017 | ............ B64C 39/024 |
| EP | 2910468 A1 | * | 8/2015 | ............ B64C 25/60 |
| EP | 3072811 A1 | * | 9/2016 | ............ F16F 9/20 |
| JP | 2016033807 A | * | 3/2016 | ............ G01S 5/0072 |
| KR | 20120061775 A | * | 6/2012 | ............ B64F 1/22 |
| KR | 20160093580 A | * | 8/2016 | |
| RU | 2550887 C2 | * | 5/2015 | |
| RU | 2620400 C2 | * | 5/2017 | ............ A62C 5/022 |
| WO | WO-2008016311 A2 | * | 2/2008 | ............ B60B 19/125 |
| WO | WO-2008115170 A1 | * | 9/2008 | ............ B64F 1/305 |
| WO | WO-2010145637 A1 | * | 12/2010 | ............ B64F 1/007 |
| WO | WO-2011137529 A1 | * | 11/2011 | ............ B64F 1/22 |
| WO | WO-2012063220 A2 | * | 5/2012 | ............ B64C 27/04 |
| WO | WO-2015032665 A1 | * | 3/2015 | ............ B64F 1/125 |
| WO | WO-2017046699 A1 | * | 3/2017 | ............ G01S 19/48 |
| WO | WO-2017130181 A1 | * | 8/2017 | ............ B64F 1/0299 |
| WO | WO-2017194069 A1 | * | 11/2017 | ............ B64F 1/22 |
| WO | WO-2018015960 A1 | * | 1/2018 | ............ B60L 53/36 |
| WO | WO-2018034615 A1 | * | 2/2018 | ............ B64F 1/30 |
| WO | WO-2018042238 A1 | * | 3/2018 | ............ B64F 1/125 |
| WO | WO-2018169695 A1 | * | 9/2018 | ............ G06Q 10/08 |
| WO | WO-2019055685 A1 | * | 3/2019 | ............ B64C 39/02 |

* cited by examiner

SYSTEM FOR RELIABLE LANDING GEAR CONTACT WITH IDENTIFICATION OF THE SURFACE

CROSS-REFERENCE TO RELATED APPLICATIONS

The present application claims priority to U.S. Provisional Application Ser. No. 62/633,309, which was filed on Feb. 21, 2018, the contents of which are incorporated herein by reference in their entirety.

BACKGROUND OF THE INVENTION

The subject matter disclosed herein relates generally to a system and method for detecting contact between an aircraft landing gear and a landing surface and, more particularly, to detecting an electrical discharge indicative of the contact between the landing gear and the surface.

For fly-by-wire and autonomous aircraft, as well as for fixed wing aircraft, the ability to reliably detect when the aircraft makes contact with the ground is important for landing operations.

BRIEF DESCRIPTION OF THE INVENTION

According to one embodiment, a method of landing an aircraft is disclosed, the method including: applying an electrical charge to a landing gear of the aircraft; measuring a discharge rate of the electrical charge from the landing gear; and determining contact of the landing gear with a surface from the discharge rate.

In addition to one or more of the features described above, a type of surface in contact with the landing gear is determined from the discharge rate. The type of surface can be at least one of land, water, and cement, for example.

In addition to one or more of the features described above, determining the contact of the landing member with the surface includes comparing the measured discharge rate to a previous discharge rate obtained when the landing gear is in free air.

In addition to one or more of the features described above, the landing gear is one of a tire and a landing skid of the aircraft. When the landing gear is a tire, a charge can be applied to a conductive element within the tire, and a contact force can be determined between the tire and the surface from a change in capacitance between the tire and the conductive element.

In addition to one or more of the features described above, a parameter of a landing operation is changed in response to determining the contact with the surface.

In addition to one or more of the features described above, the electrical charge is applied and the discharge rate is measured a plurality of times using a charge/discharge/cycle applied to the landing gear.

According to another embodiment, a landing assembly of an aircraft is disclosed, the landing assembly including: a landing gear; a charging circuit configured to apply a charge to the landing gear; a sampling circuit configured to measure a discharge rate of the electrical charge from the landing gear; and a processor configured to determine a contact between the landing gear and a surface from the discharge rate.

In addition to one or more of the features described above, the processor is further configured to determine a type of surface in contact with the landing gear from the discharge rate.

In addition to one or more of the features described above, the processor is further configured to determine the contact of the landing member with the surface by comparing a current discharge rate to a previous discharge rate obtained when the landing member is in free air.

In addition to one or more of the features described above, the landing member is one of a tire and a landing skid. The landing member can have a conductive element therein, and the charging circuit applies the charge to the conductive element and to the tire and the processor determines a contact force between the tire and the surface from a change in capacitance between the tire and the conductive element.

In addition to one or more of the features described above, the processor provides an indication signal to the aircraft to change a parameter of a landing operation in response to determining the contact with the surface.

In addition to one or more of the features described above, the charging circuit applies the electrical charge and the sampling circuit measures the discharge rate a plurality of times according to a charge/discharge cycle provided by the processor.

BRIEF DESCRIPTION OF THE DRAWINGS

The subject matter disclosed herein is particularly pointed out and distinctly claimed in the claims at the conclusion of the specification. The foregoing and other features and advantages of embodiments disclosed herein are apparent from the following detailed description taken in conjunction with the accompanying drawings in which:

DETAILED DESCRIPTION OF THE INVENTION

Figure 1:
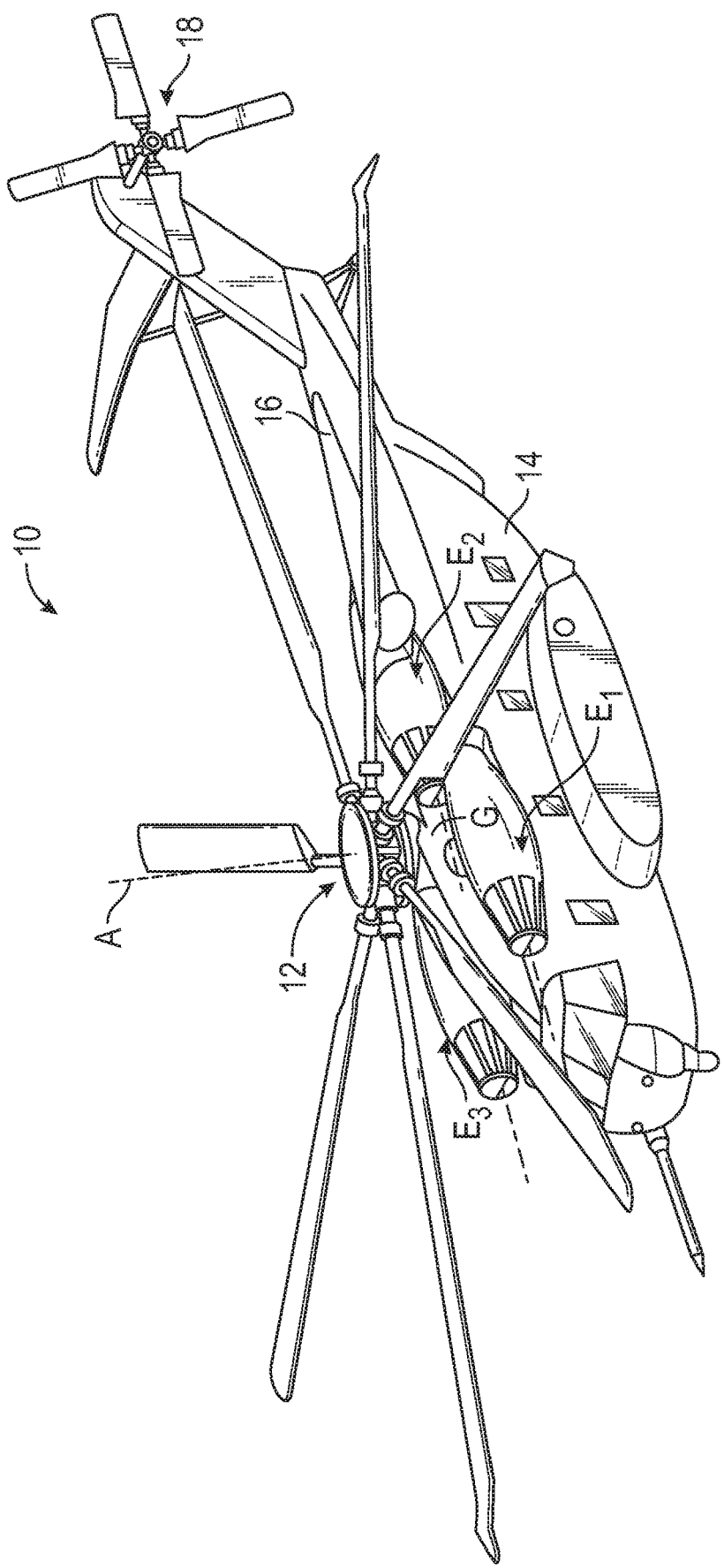
FIG. 1 schematically illustrates a rotary-wing aircraft having a main rotor system.

With reference to FIG. 1, FIG. 1 schematically illustrates a rotary-wing aircraft 10 having a main rotor system 12. The aircraft 10 includes an airframe 14 having an extending tail 16 which mounts a tail rotor system 18, such as an anti-torque system, a translational thrust system, a pusher propeller, or a rotor propulsion system for example. Power is transferred from one or more engines E1-E3 to a power transmission gearbox G, to drive the main rotor system 12 about a respective axis of rotation A. Although a particular rotary wing aircraft configuration is illustrated and described in the disclosed embodiment, other configurations and/or machines, such as a high speed compound rotary wing aircraft with supplemental translational thrust systems, a dual contra-rotating, coaxial rotor system aircraft, and a turbo-prop, tilt-rotor or tilt-wing aircraft for example, will also benefit from the present invention. The aircraft 10 includes a landing gear (not shown) and a system for determining contact between the landing gear and a landing surface, as discussed below.

Figure 2:
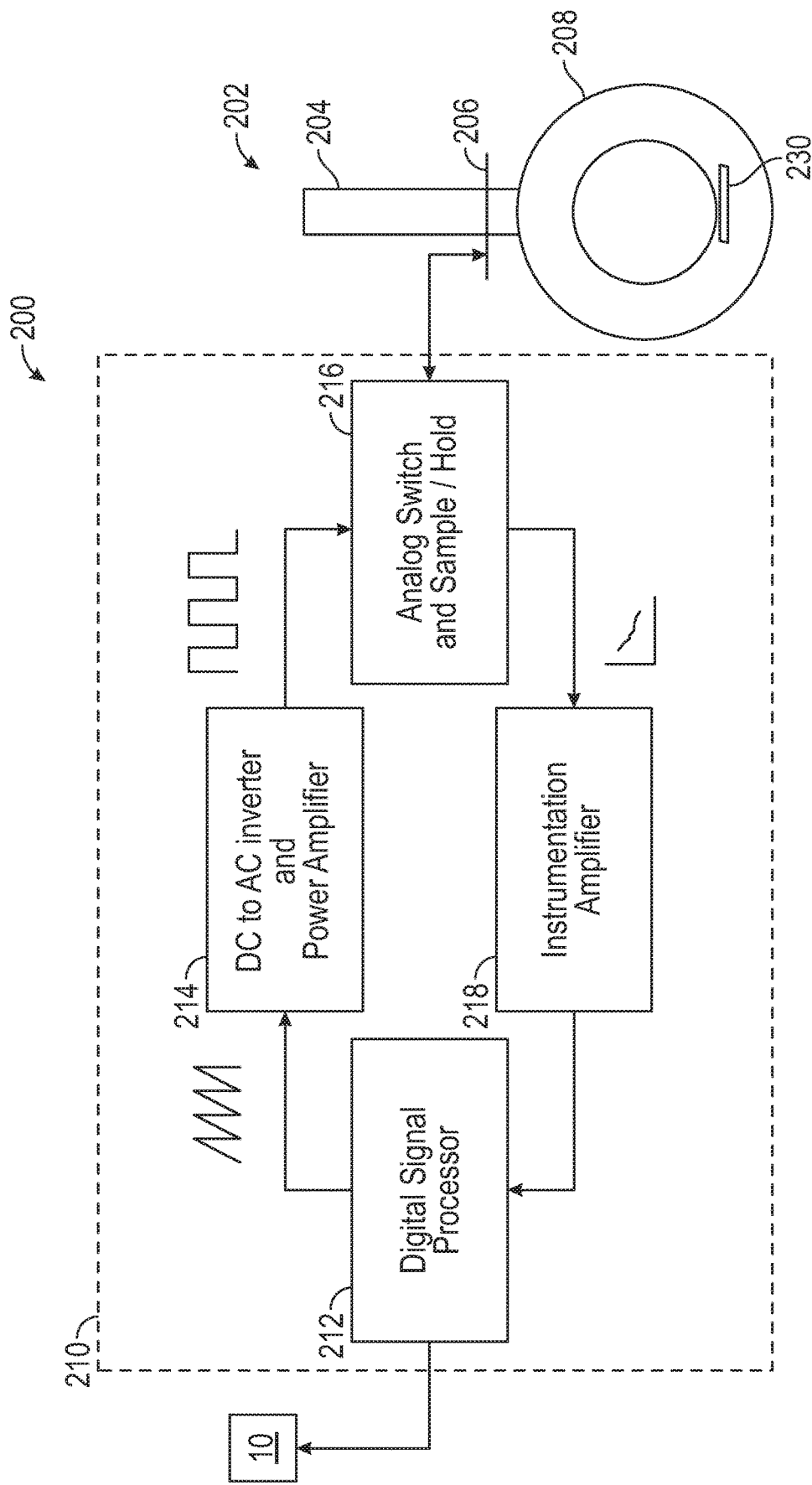
FIG. 2 schematically illustrates a landing system for the rotary-wing aircraft of FIG. 1.

FIG. 2 schematically illustrates a landing system 200 for the rotary-wing aircraft 10 of FIG. 1. The landing system 200 includes a landing assembly 202 and landing electronics 210. The illustrative landing assembly 202 includes a strut 204 having a landing gear 208 attached. The landing gear 208 can be a tire as shown in FIG. 2 or any other suitable landing element, such as a landing skid. The strut 204 further includes a metal plate 206 in electrical communication with the landing electronics 210 for transfer of an electrical charge from the landing electronics 210 to the landing gear 208. The metal plate 206 can be placed a few millimeters from the landing gear 208.

The landing electronics 210 provides a charge to the landing gear 208 and measures a discharge rate of the charge from the landing gear 208 in order to determine whether the landing gear 208 is in contact with a surface, such as a landing surface. When the landing gear 208 is in free air, i.e., when the landing gear 208 is not in contact with any surface, the charge discharges from the landing gear 208 at a free-air discharge rate, which is a relatively slow discharge rate due to the low dielectric constant of the surrounding air. However, when the landing gear 208 is in contact with a surface, the discharge rate increases significantly, i.e., the landing gear 208 discharges relatively quickly in comparison to its discharge in free air, due to the higher dielectric constant of the surface vs. the dielectric constant of air. The landing electronics 210 measures the discharge rate of the charge and determines therefrom whether the landing gear 208 is in contact with a surface or not. A measurement of a contact force between the landing gear 208 and the surface is not needed in order to determine contact.

Figure 3:
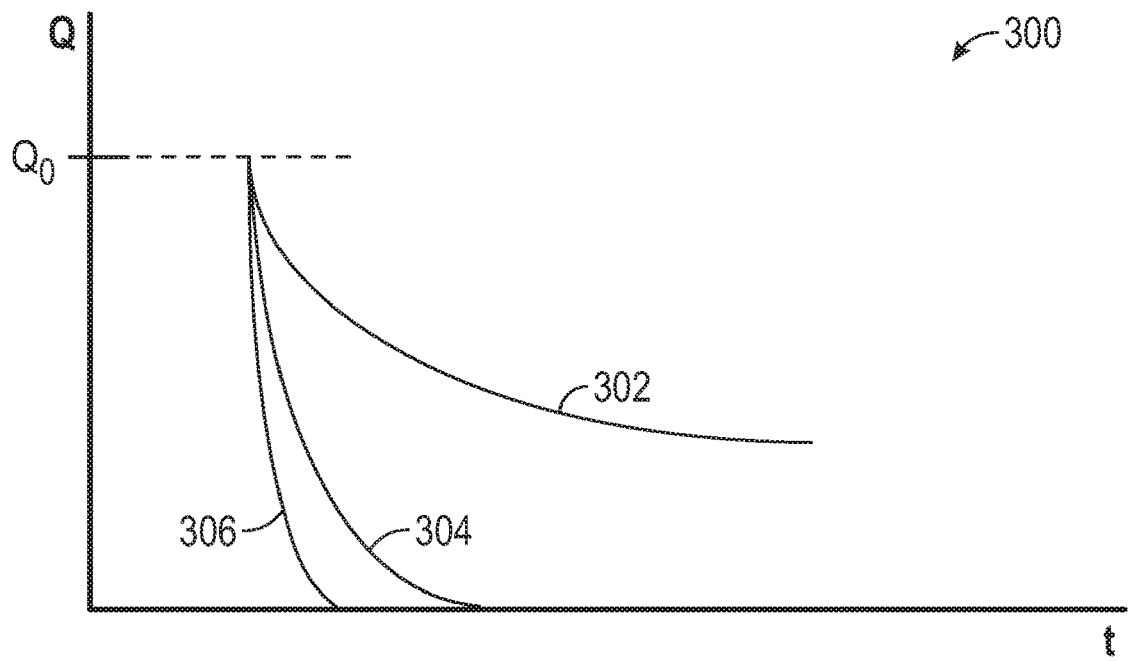
FIG. 3 shows illustrative discharge rates that occur for contact between landing gear and a plurality of materials.

In other aspects, the landing electronics 210 determines a type of landing surface from the discharge rate. FIG. 3 shows a graph 300 of illustrative discharge rates that occur for contact between landing gear 208 and a plurality of materials. For example, the free-air discharge rate 302 is relatively slow, i.e., has a relatively long discharge time. In contrast, the ground discharge rate 304 and water discharge rate 306 are quicker than the free-air discharge rate 302. Additionally, due to differing dielectric constants of ground and water, the ground discharge rate 304 and water discharge rate 306 as distinguishable from each other, allowing for determining what type of landing surface is in contact by the landing gear 208.

Referring again to FIG. 2, the landing electronics 210 includes a digital signal processor (DSP) 212, a DC/AC inverter and power amplifier 214, an analog switch and sample/hold circuit (the "sample/holed circuit" 216) and an Instrumentation Amplifier 218. The DSP 212 generates a driving waveform. The driving waveform can be a saw-tooth waveform (as shown in FIG. 2), a sinusoidal waveform, or other non-linear waveform, for example. In various embodiments, the driving waveform can having a period of several milliseconds. The driving waveform is provided to the DC/AC inverter and power amplifier 214 which converts the driving waveform to a pulse width modulated (PWM) waveform and amplifies the PWM waveform. In various embodiments, the PWM waveform can be amplified to several thousand volts. The sample/hold circuit 216 applies the amplified PWM waveform to the metal plate 206 to thereby charge to the landing gear 208.

After charging the landing gear 208 for several cycles, the DSP 212 controls the sample/hold circuit 216 to switch between a charge cycle and a discharge cycle in which the sample/hold circuit 216 measures the current charge on the landing gear 208 over a selected time period. As the landing gear 208 discharges, a discharge curve, such as shown in FIG. 3, is measured at the sample/hold circuit 216. This process of charging and discharging can be repeated several hundred times per second, based on a period of the driving waveform generated by the DSP 212.

The measured charge is transferred from the sample/hold circuit 216 to the DSP 212 via the Instrumentation Amplifier 218. Upon receiving the measured charge, the DSP 212 determines a discharge rate of the charge from the landing gear 208 and determines whether the landing gear 208 is in contact with a surface from the discharge rate. The DSP 212 then provides a signal to the aircraft 10 indicating contact with a surface.

In another embodiment, the landing system 200 can measure a force of contact between landing gear 208 and a landing surface. In embodiments in which the landing gear 208 is a tire, a conductive element 230 such as a metallic strip can be placed on an inside of the tire and the landing electronics 210 can apply a charge to the conductive element 230 as well as the surface charge to the tire through respective conductive leads. Thus, the tire and the conductive element 230 act as a capacitor. The sample/hold circuit 216 measures the capacitance between the tire and the conductive element 230 and, by measuring a change in the capacitance, determines a force of contact due to compression of the tire from the landing surface as the weight of the aircraft is placed on the tire.

Figure 4:
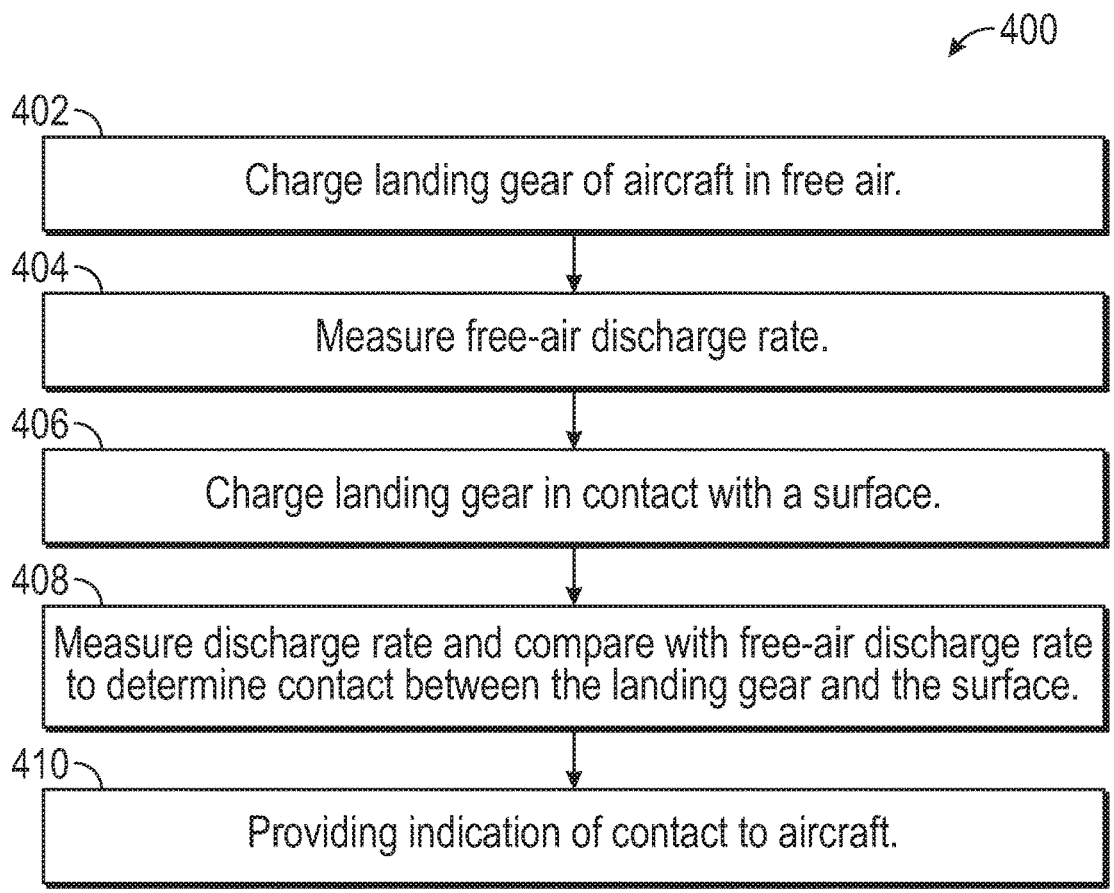
FIG. 4 shows a flowchart illustrating a method for determining a contact of the landing gear with a landing surface.

FIG. 4 shows a flowchart 400 illustrating a method for determining a contact of the landing gear 208 with a landing surface. In box 402, as landing operations are commenced the landing electronics 210 charges the landing gear 208. In box 404, the landing electronics 210 measures discharge rate of the charged landing gear 208 in order to determine the discharge rate in free air. The DSP 212 can measures the free-air discharge rate multiple times while the landing gear 208 is in air. In box 406, the landing electronics 210 charges the landing gear 208. In box 408, as the landing gear 208 makes contact with a surface, the DSP 212 measures the discharge rate and compares the discharge rate to the discharge rate for free air to thereby determine that contact has been made. In box 410, the DSP 212 provides an indication signal to the aircraft 10. In various embodiments, the indication signal can be in the form of a visual signal, an audible signal, etc. In other embodiments, the indication signal can be used to change a parameter of the landing operation of the aircraft, generally in order to control the landing operation based on the knowledge that contact has been made with the landing surface.

While embodiments disclosed herein have been described in detail in connection with only a limited number of embodiments, it should be readily understood that the disclosure is not limited to such disclosed embodiments. Rather, embodiments of the present disclosure can be modified to incorporate any number of variations, alterations, substitutions, combination, sub-combination, or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:
1. A method of landing an aircraft, comprising:
  applying an electrical charge to a landing gear of the aircraft;
  measuring a discharge rate of the electrical charge from the landing gear;
  determining contact of the landing gear with a surface from the discharge rate; and determining a type of surface in contact with the landing gear based on a comparison of the discharge rate to a plurality of predetermined discharge rates, each of the plurality of predetermined discharge rates corresponding to a different type of surface.

2. The method of claim 1 further comprising determining the type of surface from at least one of land, water, and cement.

3. The method of claim 1 further comprising determining the contact of the landing member with the surface by comparing the measured discharge rate to a previous discharge rate obtained when the landing gear is in free air.

4. The method of claim 1, wherein the landing gear is one of a tire and a landing skid of the aircraft.

5. The method of claim 4, wherein the landing gear is a tire, further comprising applying the charge to a conductive element within the tire, and determining a contact force between the tire and the surface from a change in capacitance between the tire and the conductive element.

6. The method of claim 1 further comprising changing a parameter of a landing operation in response to determining the contact with the surface.

7. The method of claim 1 further comprising applying the electrical charge and measuring the discharge rate a plurality of times using a charge/discharge/cycle applied to the landing gear.

8. A landing assembly of an aircraft, comprising: a landing gear; a charging circuit configured to apply a charge to the landing gear; a sampling circuit configured to measure a discharge rate of the electrical charge from the landing gear; and a processor configured to determine a contact between the landing gear and a surface from the discharge rate and to determine a type of surface in contact with the landing gear based on a comparison of the discharge rate to a plurality of predetermined discharge rates, each of the plurality of predetermined discharge rates corresponding to a different type of surface.

9. The landing assembly of claim 8, wherein the processor is further configured to determine the contact of the landing member with the surface by comparing a current discharge rate to a previous discharge rate obtained when the landing member is in free air.

10. The landing assembly of claim 8, wherein the landing member is one of a tire and a landing skid.

11. The landing assembly of claim 10 wherein the landing member is a having a conductive element therein, and the charging circuit applies the charge to the conductive element and to the tire and the processor determines a contact force between the tire and the surface from a change in capacitance between the tire and the conductive element.

12. The landing assembly of claim 8, wherein the processor provides an indication signal to the aircraft to change a parameter of a landing operation in response to determining the contact with the surface.

13. The landing assembly of claim 8, wherein the charging circuit applies the electrical charge and the sampling circuit measures the discharge rate a plurality of times according to a charge/discharge cycle provided by the processor.

\* \* \* \* \*